(12) United States Patent
Vissamsetty et al.

(10) Patent No.: US 10,542,044 B2
(45) Date of Patent: Jan. 21, 2020

(54) AUTHENTICATION INCIDENT DETECTION AND MANAGEMENT

(71) Applicant: Attivo Networks Inc., Fremont, CA (US)

(72) Inventors: Venu Vissamsetty, San Jose, CA (US); Srikant Vissamsetti, Bangalore (IN); Nitin Jyoti, Bengaluru (IN); Harinath Vishwanath Ramchetty, Bengaluru (IN)

(73) Assignee: ATTIVO NETWORKS INC., Fremont, CA (US)

( * ) Notice: Subject to any disclaimer, the term of this patent is extended or adjusted under 35 U.S.C. 154(b) by 334 days.

(21) Appl. No.: 15/142,860

(22) Filed: Apr. 29, 2016

(65) Prior Publication Data

US 2017/0318054 A1    Nov. 2, 2017

(51) Int. Cl.
*H04L 29/06* (2006.01)

(52) U.S. Cl.
CPC .............. *H04L 63/20* (2013.01); *H04L 63/08* (2013.01); *H04L 63/102* (2013.01); *H04L 63/1441* (2013.01)

(58) Field of Classification Search
CPC ............ G06F 21/30; G06F 21/31; H04L 9/32
USPC .................... 713/150–157; 726/2–5
See application file for complete search history.

(56) References Cited

U.S. PATENT DOCUMENTS

| | | | |
|---|---|---|---|
| 6,157,953 A * | 12/2000 | Chang | .......................... H04L 29/06 709/225 |
| 7,181,769 B1 | 2/2007 | Keanini | |
| 7,322,044 B2 | 1/2008 | Hrastar | |
| 7,596,807 B2 | 9/2009 | Ptacek | |
| 7,937,755 B1 | 5/2011 | Guruswamy | |
| 8,296,842 B2 | 10/2012 | Singh | |
| 8,528,057 B1 * | 9/2013 | Garrett | ................ H04L 63/0815 380/201 |
| 8,607,054 B2 * | 12/2013 | Ramarathinam | ... H04L 63/0807 709/227 |
| 8,627,475 B2 | 1/2014 | Loveland | |
| 8,752,173 B2 | 6/2014 | Yadav | |
| 8,850,582 B2 | 9/2014 | Endoh | |
| 8,904,527 B2 | 12/2014 | Dawson | |
| 9,185,136 B2 | 11/2015 | Dulkin | |
| 9,246,774 B2 | 1/2016 | Mataitis | |
| 9,398,001 B1 * | 7/2016 | Tidd | .................... H04L 63/0815 |
| 9,432,360 B1 * | 8/2016 | Triandopoulos | .... H04L 63/0838 |
| 9,591,006 B2 * | 3/2017 | Siva Kumar | ......... H04L 63/083 |
| 9,609,019 B2 * | 3/2017 | Vissamsetty | ........ H04L 63/1491 |
| 9,781,148 B2 * | 10/2017 | Mahaffey | ............ H04L 63/0227 |

(Continued)

*Primary Examiner* — Lynn D Feild
*Assistant Examiner* — Viral S Lakhia
(74) *Attorney, Agent, or Firm* — David R. Stevens; Stevens Law Group

(57) ABSTRACT

A system reports credentials on nodes of a network. Nodes are assigned to security silos. If a credential reported from a node is found to match a credential found on a node outside of its security silo or be for authentication with a node outside the its security an alert is generated, unless proper precautions are generated. Credentials may be reported as one-way hashes of credentials. Security silos may be automatically generated to segregate at-risk nodes from critical servers based on the presence or use of email clients and browsers. Precautions that may be used to suppress alerts, such as using KERBEROS TGT.

19 Claims, 3 Drawing Sheets

(56) References Cited

U.S. PATENT DOCUMENTS

| | | | | |
|---|---|---|---|---|
| 9,813,451 B2* | 11/2017 | Honda | | H04L 63/083 |
| 9,871,766 B2* | 1/2018 | Syed Mohamed | | H04L 63/20 |
| 2007/0208936 A1* | 9/2007 | Ramos Robles | | H04L 63/0815 |
| | | | | 713/168 |
| 2008/0083034 A1 | 4/2008 | Kim | | |
| 2009/0328196 A1* | 12/2009 | Bovee | | G06F 21/79 |
| | | | | 726/17 |
| 2011/0178930 A1* | 7/2011 | Scheidt | | G06F 21/31 |
| | | | | 705/50 |
| 2012/0084866 A1* | 4/2012 | Stolfo | | G06F 21/554 |
| | | | | 726/25 |
| 2012/0151565 A1 | 6/2012 | Fiterman | | |
| 2012/0291090 A1* | 11/2012 | Srinivasan | | G06F 21/604 |
| | | | | 726/1 |
| 2014/0298419 A1* | 10/2014 | Boubez | | H04L 63/08 |
| | | | | 726/4 |
| 2015/0013006 A1* | 1/2015 | Shulman | | H04L 63/1416 |
| | | | | 726/23 |
| 2015/0113616 A1* | 4/2015 | Sampas | | G06Q 20/206 |
| | | | | 726/6 |
| 2015/0143496 A1* | 5/2015 | Thomas | | G06F 21/34 |
| | | | | 726/7 |
| 2015/0150125 A1* | 5/2015 | Dulkin | | H04L 63/20 |
| | | | | 726/22 |
| 2015/0271200 A1* | 9/2015 | Brady | | H04L 63/1416 |
| | | | | 726/4 |
| 2016/0080414 A1* | 3/2016 | Kolton | | H04L 63/1491 |
| | | | | 726/23 |
| 2016/0127352 A1* | 5/2016 | Xu | | H04L 63/0815 |
| | | | | 726/8 |
| 2016/0142399 A1* | 5/2016 | Pace | | H04L 63/0815 |
| | | | | 726/4 |
| 2016/0212225 A1* | 7/2016 | Smith | | G06F 9/5027 |
| 2016/0381023 A1* | 12/2016 | Dulce | | H04L 63/10 |
| | | | | 726/9 |
| 2017/0141980 A1* | 5/2017 | Palanciuc | | H04L 43/08 |
| 2017/0230402 A1* | 8/2017 | Greenspan | | H04L 63/1433 |
| 2018/0020005 A1* | 1/2018 | Beiter | | H04L 63/105 |

* cited by examiner

AUTHENTICATION INCIDENT DETECTION AND MANAGEMENT

BACKGROUND

In information technology, attackers use stolen credentials to reuse and move laterally in the network from computer to computer. The term Pass-the-Hash (PtH) attack involves using a technique in which an attacker captures account logon credentials on one computer and then uses those credentials to authenticate against other computers in the network. PtH is one of the popular attack method used by attackers to move laterally inside the network.

Operating systems typically generate password hashes, which are a one-way hash of password text to hash value. The one-way hash may be used on behalf of the user to authenticate with a server. The host operating system stores the generated password hashes, tickets, etc., in local system memory or a disk. Even if the user logs off, the operating system leaves a residual entry, which can be reused.

An attacker may steal the hashes and tickets and reuse them to authenticate with the server. The PtH is one specific form of credential theft and there are other forms of reuse attacks vectors such as stealing Kerberos Ticket Granting Tickets (TGTs), etc. The goal of the attacker is to obtain domain administrator account, high privilege service accounts, local administrator accounts, etc., so that the attacker can get access to multiple systems.

The systems and methods disclosed herein provide an improved approach for preventing PtH and other attacks that include theft of stored credentials.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
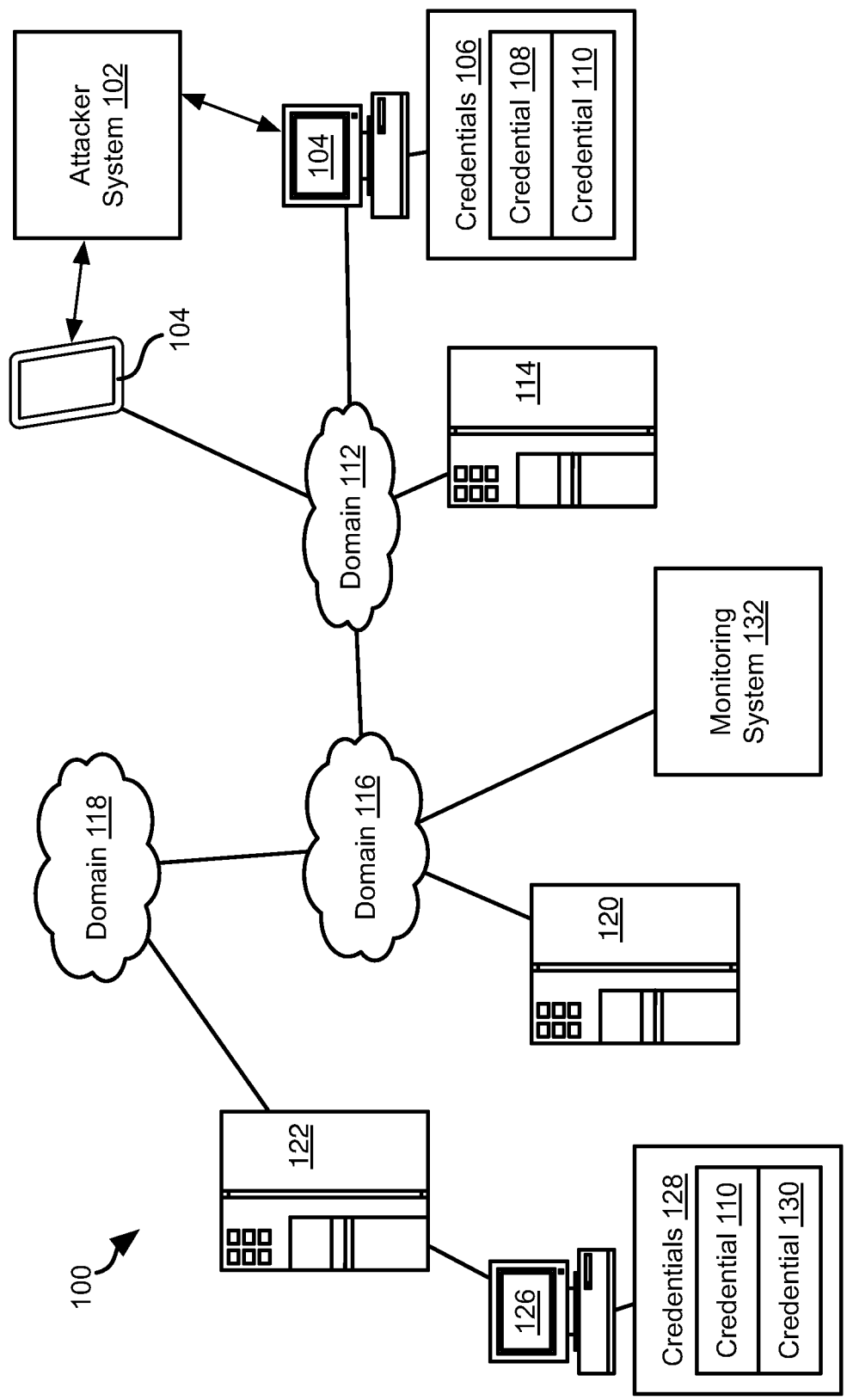
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a network environment 100 may be infiltrated by an attacker system 102. For example, the attacker system 102 may access a user computing device 104, such as a desktop or laptop computer, mobile computing device, or other computing device. Typically, a user computing device 104 will access email and websites and therefore is more vulnerable to infiltration. The user computing device 104 may store credentials 106, such as the illustrated credential 108 and credential 110. In one example, credential 108 is for authenticating a user to a computer system within a domain 112, such as with a server system 114 within the domain 112. The credentials 106 may further include a credential 110 for authenticating a user with a computing device in a different domain.

For example, the domain 112 may be part of a network including other domains 116, 118 and other server systems 120, 122 or other computing devices 126 within the domains 116, 118. In one illustrated example, credential 110 may authenticate a user with server system 122 in domain 118. As noted above, a credential may be a key, ticket, password, or a hash of any of these values that, when provided to a server system, will be accepted by the server system as authentic and in response to which, the server system will grant access to data or services hosted by the server system.

As shown in FIG. 1, another user computing device 126 may have credentials 128 including the same credential 110 as the credentials 106 of the user computing device 104. The credentials 128 may further include one or more other credentials 130 that are for a server system of a different domain than the credential 110. For example, credential 130 may authenticate a user with the server system 122 in domain 118.

A monitoring system 132 is in data communication with the user devices 104, 126 of the network 100 and monitors the credentials 106, 128 stored thereon. The monitoring system 132 may further monitor credentials stored on server systems 114, 120, 122.

Figure 2:
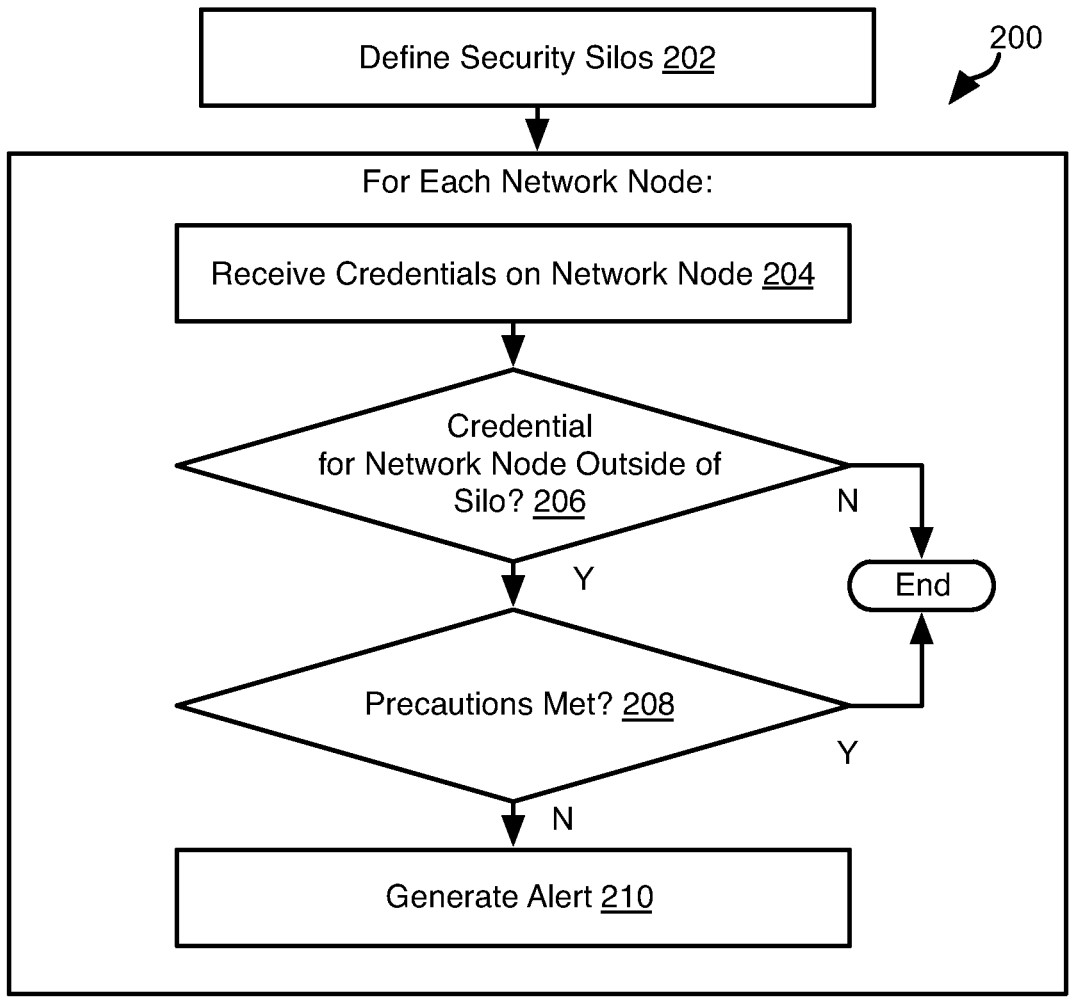
FIG. 2 is a process flow diagram of a method for managing security in accordance with an embodiment of the present invention.

FIG. 2 illustrates a method 200 that may be executed by the monitoring system 132 to manage credentials in the network environment 100. The method 200 is particularly useful for managing credentials for users using domain administration accounts to manage systems in a WINDOWS environment. These domain administrative accounts have many privileges and exposing the account puts the entire network at risk.

Enterprises typically need to apply multiple policy controls to minimize credential reuse attacks. For example, an administrator may limit the number of administrative credentials used. A security policy may ensure administrative tasks are not performed on hosts where malicious code can be downloaded (e.g., via email, web browsing, etc.). A security policy may prevent network logon for local accounts and avoid using common local logon accounts across computers since attackers can read NTLM (NT LAN Manager) hashes of one machine and move laterally from one device to another. A security policy may require that servers that host important data applications are not accessed using RDP (remote desktop protocol). In some systems, hosts on which administrative tasks are preformed restrict use of RDP to remote clients, since when a user logs on interactively using RDP, the credentials for the host are stored in memory on the remote client.

The method 200 of FIG. 2 may be used in addition, or in place of, the security policies described above. For example, the method 200 of FIG. 2 may be used to ensure that some or all of the risks avoided using the security policies described above are avoided without actually limiting the hosts available for performing administrative tasks.

The method 200 may be executed by the monitoring system 132 in cooperation with a software component executing on network nodes monitored using the monitoring system 132, e.g. the user computing devices 104, 126 and server systems 114, 120, 122.

The method 200 may include defining 202 security silos for a network environment 100. In particular, each node may be assigned to at least one silo. In some instances, a node is assigned to only one silo. In some instances, each domain 112, 116, 118 may be assigned to a separate silo. In some instances, multiple domains may be assigned to the same silo but all nodes of a domain 112, 116, 118 belong to the same silo. In other instances, nodes are assigned to silos without regard to the domain 112, 116, 118 to which the nodes belong such that nodes of the same domain 112, 116, 118 are assigned to different silos. A silo itself may be represented by the monitoring system 132 as separate lists of nodes (e.g. IP addresses or other node identifiers), each list representing a security silo. The monitoring system 132 may define and store authentication silos (policies) using high level domain specific language (DSL) or XML (extensible markup language)/JSON (JavaScript Object Notation). The step of defining 202 security silos may be a manual process or may be performed automatically base on a representation of the topology of a network, e.g. a silo may be defined for each domain 112, 116, 118 that includes all of the nodes of the each domain. The monitoring system 132 may integrate with Active Directory to obtain information about each user's role, group, etc. The monitoring system then uses that information to create authentication silos.

A silo can be constructed by virtue of groupings and relationships. A grouping is derived from the Active Directory server that is typically used in an enterprise computer environment to manage users and computers. A grouping could be as simple as an "Organizational Unit" in Active Directory, such that all computers belonging to one organizational unit may be assigned to one silo. In another example, a grouping could be all computers belonging to a "Group" object in the Active Directory. A silo could also be constructed in a more intelligent and derived form. An example derivation could be learning the behavior of computer logons in the network over period of time. Users frequently and repeatedly logging on a node or device can be grouped together as a silo for that specific node. The users belonging to the same organizational unit or user group in Active Directory as these frequent users may also be included in the same silo.

The method 200 may further include receiving 204 a representation of credentials stored on each node of the network. Each node may execute a software component that reports a representation of credentials stored on the each node. For example, the software component may monitor a state of the each node and transmit a representation of that state to the monitoring system 132. The software component may execute continuously, i.e. report changes to the state as they occur or report the state periodically according to a fixed or variable period, e.g. every 10 seconds, every hour, etc. The period may be selected to avoid impairing performance of the each node while also reducing window during which risky conditions exist.

The credentials may be gathered from various locations on the node by the software component. For example, from LSASS (Local Security Authority Subsystem Service), WINDOWS Credential Manager, the SAM (Security Account Manager) database, WDigest (a digest authentication protocol), and the like. Table 1 illustrates information that may be transmitted to the monitoring system 132.

TABLE 1

Node State Information.

| Computer | Type | User Account | Service | Domain/LogonServer | SHA1 (Hashes) |
|---|---|---|---|---|---|
| HOST1 | NTLM | Administrator | RDP | MLSC/DC1host.com | E133ddd . . . |
| HOST1 | SAM | User101 | LOCAL | | |
| HOST2 | Kerberos | | SMB | | |
| HOST2 | WDigest | | HTTP | | |
| HOST2 | SAM | Local Account | LOCAL | Local Computer | Aass333sd23 . . . |
| HOST3 | SAM | Local Account | LOCAL | Local Computer | Aass333sd23 . . . |

The "SHA1 column" includes hashes of the credentials found. The credential itself may be a hash. However, in order to avoid sending any sensitive information over a network, a representation of the credentials found on a node may be generated by the software component executing on the node and this representation is transmitted rather than the credential itself. In some embodiments, this is a one-way hash. In this manner, a credential may be compared to other credentials by comparing the one-way hashes thereof, but the one-way hash itself is not usable as a credential.

The monitoring system 132 receives 204 the system state information from each node. The monitoring system 132 does data analysis on data received from each end-point and notify computers that are susceptible to compromise in real-time. Inasmuch as the software components of the nodes may periodically send their state to the monitoring system 132, whether violations of the security silos occur may be identified quickly. Thus policy violations that can result in credential theft and reuse attacks are detected before any attack occurs. The received 204 state information is stored for each node such that a comparison of the state information of the nodes of the network environment 100 may be performed as described below.

In some embodiments, the analysis performed on the state information received from a node (hereinafter "the current node") may include performing steps 206-210. At step 206, the monitoring system 132 evaluates whether one or more of the credentials received at step 204 references a network node outside of a security silo to which the current node is assigned. This may include evaluating an IP address, domain name, or other identifier of a computer system referenced by a credential (e.g. the "Domain LogonServer" of Table 1). In some embodiments, the one-way hash of a credential received from the current node may be compared to one-way hashes of other credentials received from some or all of the other network nodes of the network environment 100. In the example of FIG. 1, this would identify that user computer 104 has a credential 110 that matches the credential 110 of the user computer 126. Accordingly, if user computers 126, 104 are in different security silos, then step 206 would determine that user computer 104 has credentials of a network node outside of its own security silo that belongs to user computer 126, and vice versa.

If no credentials are found 206 matching credentials obtained from nodes outside of the current node's security silo or for authenticating a user with a node outside the current node's security silo, then no action is taken to generate an alert or otherwise report or deal with a violation in some embodiments.

If a credential stored on the current node is found 206 to reference a network node outside of the current node's security silo or matches a credential found on a node outside the current node's security silo, then an alert may be generated 210. In some embodiments, an alert is generated 210 only if proper precautions 208 were not met with respect to the credential identified at step 206 as being a security policy violation. Generating 210 an alert may include transmitting a notification to a system administrator by means of email, text, or other means. Generating 210 an alert may include displaying a warning on the current node indicating that one or more credentials violating the security policy should be deleted.

For example, in the Remote Desktop Protocol, a user may remotely logon to a remote computer having a "Restricted Admin Mode" switch turned on. Accordingly, if a credential of an administrator found to be a violation of a security silo may not invoke generation 210 of an alert if the credential is stored on the current node in the context of an RDP session in which the "Restricted Admin Mode" is used. When a user logs on interactively to a computer using RDP, the credentials of the user are stored in memory on the target system for a specific interval of time. An attacker who has access to target system can dump memory and obtain NTLM hashes and use them in PtH attacks. The "Restricted Admin Mode" switch uses KERBEROS TGT (ticket granting) to get a session ticket and connect to the remote computer when doing network logon using the session ticket, which will expire after a predefined time period. Whether a KERBEROS TGT is used may be determined at step 208. If one is not used, then an alert is generated 210. If not, then a record of the RDP session may be recorded in a log, but an alert may not be generated 210 in some embodiments.

In another example, a security silo may prohibit access to domain controllers from hosts where malicious code can be downloaded (via email, web browsing etc.). Accordingly, a node may be identified by the monitoring system 132 as having a state indicating browsers or mail clients installed thereon, such as from KERBEROS ticket information. Accordingly, the monitoring system 132 may assign that node to a different silo than the domain controllers. If a credential for the domain controllers is found 206 on such a node without precautions 208 being met, then an alert will be generated 210.

In another example, each node includes one or more local accounts stored in a SAM database. If the same local accounts are configured on different nodes, attackers can move laterally using NTLM hashes if network logon is not disabled. Using the method 200, the existence of the same credential on different nodes will be identified at step 206. If the different nodes belong to different security silos, an alert will be generated 210.

Figure 3:
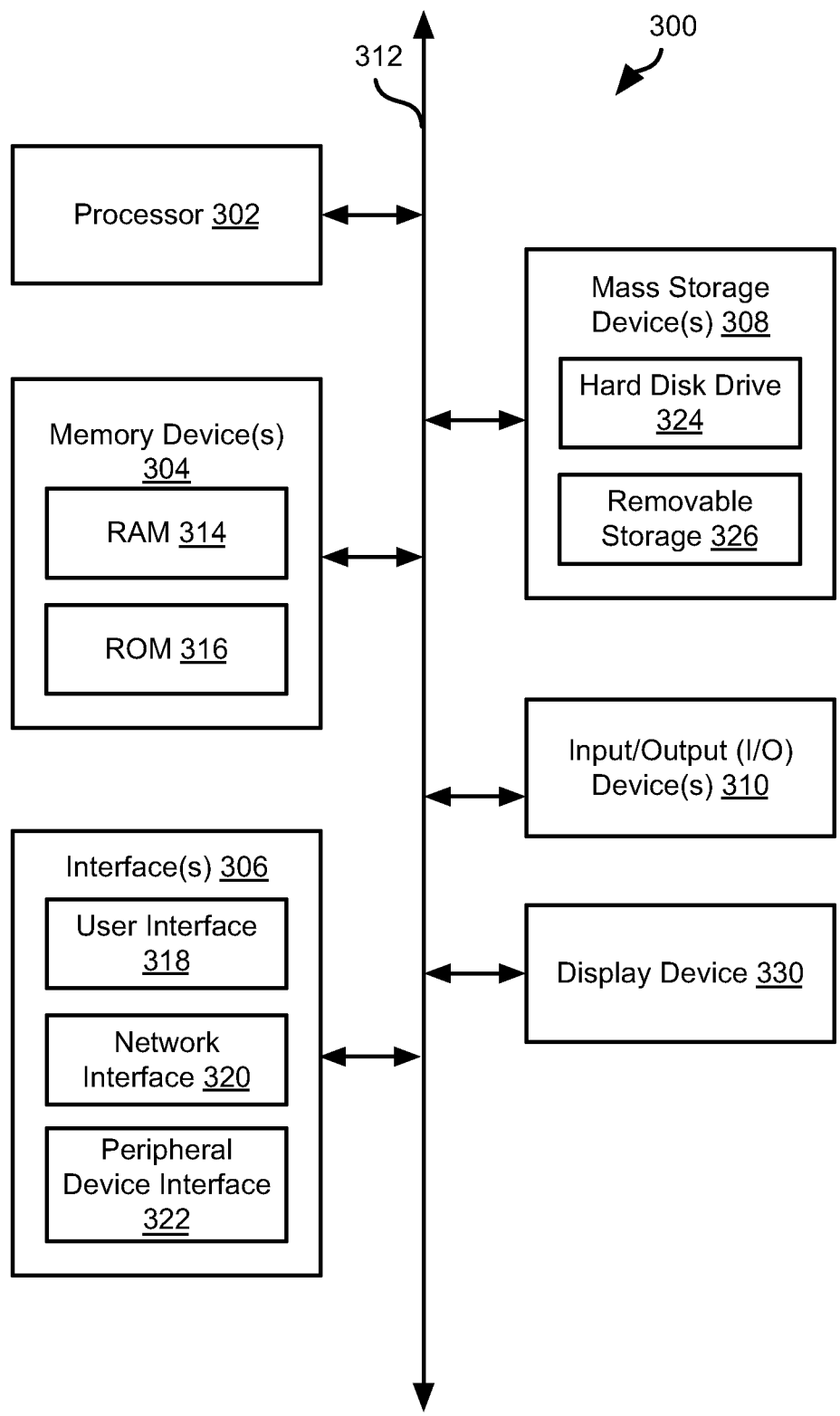
FIG. 3 is a schematic block diagram of a computer system suitable for implementing methods in accordance with an embodiment of the present invention.

FIG. 3 is a block diagram illustrating an example computing device 300 which can be used to implement the systems and methods disclosed herein. The user computing devices 104, 126 and servers 114, 120, 122 may have some or all of the attributes of the computing device. Computing device 300 can function as a server, a client, or any other computing entity. Computing device 300 can perform various monitoring functions as discussed herein, and can execute one or more application programs, such as the application programs described herein. Computing device 300 can be any of a wide variety of computing devices, such as a desktop computer, a notebook computer, a server computer, a handheld computer, tablet computer and the like.

Computing device 300 includes one or more processor(s) 302, one or more memory device(s) 304, one or more interface(s) 306, one or more mass storage device(s) 308, one or more Input/Output (I/O) device(s) 310, and a display device 330 all of which are coupled to a bus 312. Processor(s) 302 include one or more processors or controllers that execute instructions stored in memory device(s) 304 and/or mass storage device(s) 308. Processor(s) 302 may also include various types of computer-readable media, such as cache memory.

Memory device(s) 304 include various computer-readable media, such as volatile memory (e.g., random access memory (RAM) 314) and/or nonvolatile memory (e.g., read-only memory (ROM) 316). Memory device(s) 304 may also include rewritable ROM, such as Flash memory.

Mass storage device(s) 308 include various computer readable media, such as magnetic tapes, magnetic disks, optical disks, solid-state memory (e.g., Flash memory), and so forth. As shown in FIG. 3, a particular mass storage device is a hard disk drive 324. Various drives may also be included in mass storage device(s) 308 to enable reading from and/or writing to the various computer readable media. Mass storage device(s) 308 include removable media 326 and/or non-removable media.

I/O device(s) 310 include various devices that allow data and/or other information to be input to or retrieved from computing device 300. Example I/O device(s) 310 include cursor control devices, keyboards, keypads, microphones, monitors or other display devices, speakers, printers, network interface cards, modems, lenses, CCDs or other image capture devices, and the like.

Display device 330 includes any type of device capable of displaying information to one or more users of computing device 300. Examples of display device 330 include a monitor, display terminal, video projection device, and the like.

Interface(s) 306 include various interfaces that allow computing device 300 to interact with other systems, devices, or computing environments. Example interface(s) 306 include any number of different network interfaces 320, such as interfaces to local area networks (LANs), wide area networks (WANs), wireless networks, and the Internet. Other interface(s) include user interface 318 and peripheral device interface 322. The interface(s) 306 may also include one or more user interface elements 318. The interface(s) 306 may also include one or more peripheral interfaces such as interfaces for printers, pointing devices (mice, track pad, etc.), keyboards, and the like.

Bus 312 allows processor(s) 302, memory device(s) 304, interface(s) 306, mass storage device(s) 308, and I/O device(s) 310 to communicate with one another, as well as other devices or components coupled to bus 312. Bus 312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 300, and are executed by processor(s) 302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

What is claimed:

1. A method comprising:
    receiving, by a computer device, definitions of a plurality of silos, such that a first silo references a first group of nodes of a plurality of network nodes and a second silo references a second group of nodes of the plurality of network nodes not included in the first group of nodes, each node of the plurality of network nodes being one of a plurality of computing devices;
    evaluating, by the computer device, credentials stored on each node of the plurality of network nodes;
    identifying, by the computer device, one or more credentials stored on a first node referenced by the first silo of the plurality of silos, the one or more credentials effective to authenticate the first node with respect to one or more other nodes of the plurality of network nodes;
    determining, by the computer device, that a first credential of the one or more credentials stored on the first node matches an authentication credential of a second node of the plurality of network nodes that is not referenced by the first silo, the authentication credential being effective to authenticate with respect to the second node;
    in response to determining that the first credential matches the authentication credential for the second node that is not referenced by the first silo, generating, by the computer device, an alert;
    determining, by the computer device, that a second credential of the one or more credentials stored on the first node matches an authentication credential of a third node of the plurality of network nodes that is referenced by the first silo, the authentication credential being effective to authenticate with respect to the third node; and
    in response to determining that the first credential matches the authentication credential for the second node that is not referenced by the first silo, refraining, by the computer device, from generating an alert.

2. The method of claim 1, wherein the first credential is stored on the first node as part of a remote desktop protocol connection.

3. The method of claim 1, comprising:
identifying, by the computer device, one or more credentials stored on a second node of the plurality of network nodes, the second node referenced by a second silo of the plurality of silos;
determining, by the computer device, that a second credential of the one or more credentials stored on the second node matches an authentication credential of a node of the plurality of network nodes that is not referenced by the second silo; and
determining, by the computer device, that the second credential of the one or more credentials is stored on the second node within a secure session;
in response to determining that the second credential is stored on the second node within the secure session, refraining from generating the alert.

4. The method of claim 3, wherein the secure session is a KERBEROS session.

5. The method of claim 3, further comprising:
in response to determining that the second credential is stored on the second node within the secure session, recording, by the computer device, a log entry recording determining that the second credential of the one or more credentials stored on the second node matches the authentication credential of the node of the plurality of network nodes that is not referenced by the second silo.

6. The method of claim 3, comprising:
identifying, by the computer device, one or more credentials stored on a third node of the plurality of network nodes, the third node referenced by a third silo of the plurality of silos;
determining, by the computer device, that a third credential of the one or more credentials matches an authentication credential for a node of the plurality of network nodes that is referenced by the third silo; and
in response to determining that the third credential is referenced by the third silo, refraining from generating the alert.

7. The method of claim 1, wherein each silo of the plurality of silos references all nodes of the plurality of network nodes belonging to a network domain.

8. The method of claim 1, wherein each silo of the plurality of silos references less than all nodes of the plurality of network nodes belonging to a network domain.

9. The method of claim 1, wherein evaluating the credentials stored on each node of the plurality of network nodes is performed continuously.

10. The method of claim 1, wherein determining that the first credential of the one or more credentials stored on the first node is the authentication credential for the node of the plurality of network nodes that is not referenced by the first silo comprises:
generating, by a component executing on the first node, a first one-way hash of the first credential;
transmitting, by the component executing on the first node, the first one-way hash to the computer device; and
identifying, by the computer device, a stored one-way hash that matches the first one-way hash.

11. A system comprising one or more processing devices and one or more memory devices coupled to the one or more processing devices, the one or more memory devices storing executable code effective to cause the one or more processing devices to:
receive definitions of a plurality of silos, each silo definition referencing at least one node of a plurality of network nodes such that a first silo references a first group of nodes of the plurality of network nodes and a second silo references a second group of nodes of the plurality of network nodes not included in the first group of nodes;
for each node of the plurality of network nodes—
(a) evaluate credentials stored on the each node;
(b) if a first credential stored on the each node matches an authentication credential enabling automatic authentication with a second node of the plurality of network nodes that is not referenced by a silo referencing the each node, generating an alert; and
(c) if the first credential stored on the each node matches an authentication credential enabling automatic authentication with a third node of the plurality of network nodes that is referenced by the silo referencing the each node, refraining from generating the alert.

12. The system of claim 11, wherein the first credential is stored on the first node as part of a remote desktop protocol connection.

13. The system of claim 11, wherein the executable code is further effective to cause the one or more processing devices to:
refrain from generating the alert if the first credential is stored within a secure session on the each node.

14. The system of claim 13, wherein the secure session is a KERBEROS session.

15. The system of claim 13, wherein the executable code is further effective to cause the one or more processing devices to:
if the first credential is stored on the each node within the secure session, record a log entry recording that the first credential matches the authentication credential of the a second node of the plurality of network nodes that is not referenced by the silo referencing the each node.

16. The system of claim 11, wherein each silo of the plurality of silos references all nodes of the plurality of network nodes belonging to a network domain.

17. The system of claim 11, wherein each silo of the plurality of silos references less than all nodes of the plurality of network nodes belonging to a network domain.

18. The system of claim 11, wherein the executable code is further effective to cause the one or more processing devices to:
continuously perform (a) and (b) with respect to the plurality of network nodes.

19. The system of claim 11, wherein the executable code is further effective to cause the one or more processing devices to determine if a first credential stored on the each node matches the authentication credential of the a second node of the plurality of network nodes that is not referenced by the silo referencing the each node by:
receiving a first one-way hash from the each node; and
determining if a stored one-way hash matches the first one-way hash.

* * * * *